March 25, 1952     R. L. TAYLOR     2,590,584
SEA WATER BATTERY
Filed March 29, 1945
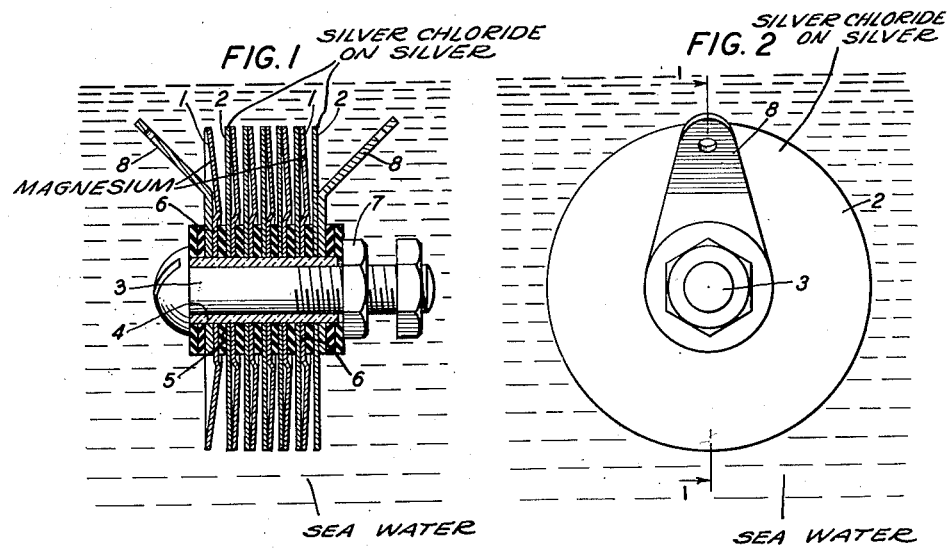
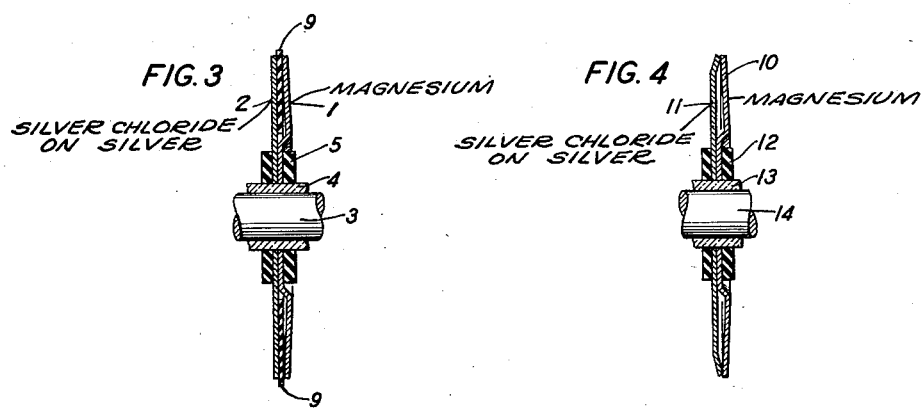
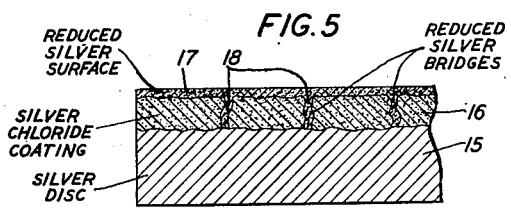
INVENTOR
R. L. TAYLOR
BY Edwin B. Cave
ATTORNEY Patented Mar. 25, 1952

2,590,584

UNITED STATES PATENT OFFICE 2,590,584

SEA-WATER BATTERY

Raymond L. Taylor, Summit, N. J., assignor to Bell Telephone Laboratories, Incorporated, New York, N. Y., a corporation of New York Application March 29, 1945, Serial No. 585,419

9 Claims. (Cl. 136—103)

This invention relates to electric batteries or more particularly to structures adapted to function as electric batteries when immersed in sea water or other electrolyte. The structures of the present invention are particularly advantageous where relatively small currents are required for relatively short periods of time and where it is required that substantially the peak operating voltage and current generating capacity be reached almost instantaneously after the structure is immersed in the electrolyte.

One form of the present invention is illustrated in the accompanying drawing in which:

Fig. 1 is a side elevation in section of one form of the battery structure, the section being taken along the line 1—1 of Fig. 2;

Fig. 2 is a front elevation of the structure shown in Fig. 1;

Fig. 3 is a side elevation in section of one pair of adjacent anode and cathode discs of succeeding cells in a modified form of the battery;

Fig. 4 is a side elevation in section of one pair of adjacent anode and cathode discs of succeeding cells in a third form of the battery; and Fig. 5 is a diagrammatic representation of a cross-section of a portion of one of the cathode discs of the battery shown in Fig. 1, the section being taken perpendicular to the plane of the cathode disc.

The battery structure shown in Figs. 1 and 2 is made up of a plurality of circular anode discs 1 and cathode discs 2 mounted alternately upon a central bolt 3 and insulated therefrom by means of an insulating sleeve 4 surrounding the bolt. The anode and cathode discs are so spaced from one another as to form a plurality of cells connected in series. The anode and cathode discs of each cell are spaced from one another by means of insulating washers 5 which are mounted over the insulating sleeve 4. Series connection between adjacent cells is established by maintaining the opposite electrodes of adjacent cells in mechanical and electrical contact. Lugs 8 are mounted over the sleeve 4 at each end of the battery to provide a convenient means for electrical connection.

For the proper functioning of the battery it is essential that electrolyte be prevented from seeping between the electrodes of adjacent cells. The presence of electrolyte between these electrods tends to reduce the contact efficiency between electrodes, to dissipate energy by internal cell action and to set up a counter-voltage between adjacent cells.

This seepage of electrolyte between cells is avoided by providing the anodes discs 1 with a dished shape such that, before the electrodes are pressed together, the periphery of the anode disc lies in a plane closer to its adjacent cathode disc 2 than does the central portion 6. The annular area of the anode disc 1 lying between the central portion 6 and the periphery lies even farther from the adjacent cathode disc than does the central portion 6. This normal shape of the anode discs when not pressed against an adjacent cathode disc may be seen in the anode disc 1 at the left end of the structure shown in Fig. 1.

When the anode discs 1 are pressed firmly against the adjacent cathode discs 2, as by tightening the nut 7 on the bolt 3, so that the center areas 6 of the anode discs are pressed firmly against the adjacent cathode discs, the peripheries of the anode discs are forced against the adjacent cathode discs with a substantial force provided by the spring action caused by the dished shape of the anode discs. This tight pressure at the periphery of the electrode discs serves to prevent entry of the electrolyte between the cells, at least throughout the period between the instant the structure is immersed in the electrolyte and the time at which the battery is completely discharged.

An even tighter seal may be obtained in some instances by inserting a washer formed of resilient or rubbery waterproof material between the edges of the adjacent anode and cathode discs of Fig. 1 as shown in Fig. 3. In Fig. 3, the washer 9 is formed of a resilient material which is capable of forming a seal when compressed between the peripheries of the anode disc 2 and the cathode disc 1. Since this material must be non-corrosive and should have little retarding action with respect to the development of full voltage, rubbery substances vulcanized with sulphur should be avoided. A very satisfactory substance for forming the washers 9 is the synthetic rubber known as paracon, which is a high molecular weight, essentially linear polyester vulcanized with benzoyl peroxide.

In place of a dished anode as shown in Figs. 1 and 3, it is obvious that a similar result can be obtained by using a dished cathode. Dishing of the electrodes is advantageous not only because it provides sealing but also because it provides additional mechanical strength in the electrodes. This additional mechanical strength prevents bending and short-circuiting of the electrodes by inrushing sea water. When used in explosive devices, batteries of the type described are often subjected to explosive shock before electrolyte is admitted. The additional strength provided by dishing prevents short-circuiting of the electrodes through bending due to shock. Therefore, where high shock resistance is required, dishing of both electrodes is desirable.

In Fig. 4 is shown a portion of a battery in which both electrodes are dished. In this battery the structure of the central bolt 14, insulating sleeve 13, insulating washers 12 and anode discs 10 is essentially the same as that of the corresponding elements of Fig. 1. The cathode discs 11, however, are dished near the edges to provide additional rigidity.

When the structure is to function as a battery it is immersed in a suitable liquid which serves as a common electrolyte for all of the cells. This electrolyte circulates freely in the space between the electrodes of each cell but is excluded from the space between electrodes of adjacent cells as described above. Although some current leakage occurs between the cells because of the use of a common electrolyte, the power and voltage loss from this source is not important for the uses to which batteries of this sort are put. Ordinarily no shielding means is provided to prevent intercell leakage.

The structure described above is of particular value for the generation of an electric current under conditions where sea water is used as the electrolyte. With a sea water electrolyte a particularly valuable cathode in the structure described above is made up of silver sheet having a coating of activated silver chloride on the side of the disc which faces the interior of the cell. A section of a portion of a cathode disc of this type, the section being taken perpendicular to the plane of the disc, is shown diagrammatically in Fig. 3. It can be seen that the cathode is made up of a silver sheet base 15 having on one surface a silver chloride coating 16 having on its outer surface a thin layer 17 of conductive reduced porous silver electrically connected to the silver sheet by a plurality of fine filamentary conductive bridges 18 of reduced silver extending through the silver chloride body. It should be understood that the representation in Fig. 3 is purely diagrammatic and is not intended to show either true shape or true relative dimensions.

An activated silver chloride coating of this type may be formed on a silver sheet by anodizing the surface of the silver sheet in a solution containing chloride ions so as to form a body of silver chloride, cathodically reducing a portion of the silver chloride to silver whereby the filamentary bridges are formed and immersing the silver sheet in a reducing solution so as to reduce chemically the surface of the silver chloride to form the thin surface layer of silver.

The formation of filamentary bridges in the step of cathodic reduction is an inherent result of the mechanism by which this cathodic reduction takes place. Silver chloride in the solid state is a non-conductive material. Therefore any electric current which passes across a silver chloride layer immersed in an electrolyte is carried, not by the silver chloride, but by the electrolyte which penetrates across the layer through pores or gaps in the silver chloride layer.

A metal body which is completely covered by a dense, pore-free layer of silver chloride, such as may be produced by fusion, will be completely insulated electrically from the electrolyte in which it is immersed and it cannot function as an electrode nor can the silver chloride be electrochemically reduced, regardless of how thin the silver chloride coating is, if it is pore-free.

A silver chloride layer produced anodically on a silver surface in a chloride electrolyte must by nature be porous, regardless of its thickness, since the very growth of the layer requires penetration of the electrolyte through the layer to make electrical contact with the silver surface beneath. For this reason a non-porous silver chloride layer is incapable of being produced anodically in a chloride solution.

There is no mechanism by which a layer of silver chloride, porous or non-porous, on a metal base can be directly reduced electrochemically. What occurs when a metal base, having a porous silver chloride coating, is cathodically connected in an electrolyte is actually a plating operation. The small amount of silver which is in ionic solution in the electrolyte is plated out as metallic silver on the cathode at the points at which the electric current passes between the electrolyte and the cathode.

Since silver chloride is not a conductive material, the current can pass between electrolyte and cathode only at those points where the metal base of the cathode is exposed to the electrolyte, and it is only at these points of direct contact between metal base and electrolyte that silver can be plated out on the cathode. Thus, with a porous silver chloride layer, it is only at the base of the pores, where electrolyte meets metal base, that silver is plated out upon the metal base. As the base of the pores becomes filled with plated silver, more silver is deposited upon the silver already plated out at the only exposed metal surfaces available, namely, within the pores. Eventually the entire pore is filled with silver, and this silver-filled pore constitutes a bridge between the silver base and the outer surface of the silver chloride layer.

In this silver plating process, as fast as the electrolyte is depleted of silver by plating, the supply of dissolved silver is replenished by dissolution of the silver chloride in the immediate vicinity. Because of the small distances which the silver must travel from its initial state as solid silver chloride, through the electrolyte as dissolved silver, to its final state as plated silver metal, the transformation occurs with great rapidity and the relative insolubility of the silver chloride does not constitute a serious limitation on the speed of silver deposition.

Any suitable aqueous electrolyte containing chloride ions may be employed in the anodizing operation performed on the silver sheet. An aqueous solution of sodium chloride or hydrochloric acid has been found satisfactory. The concentration of chloride ions in the solution should be sufficient to give the conductivity required for a practical rate of formation of silver chloride. The upper limit of concentration is set only by the value at which the solubility of the silver chloride formed becomes unduly high at the temperature of the solution, so that the rate of deposit of undissolved silver chloride becomes too slow and an undesirable amount passes into solution. Ordinarily, an aqueous solution in which the chloride ions constitute in the vicinity of 2 per cent by weight of solution will be found satisfactory.

In order to increase the rate at which the formation of silver chloride takes place, it has been found desirable to heat the electrolyte above room temperatures. Temperatures between about 60°

C. and about 80° C., and preferably about 75° C. are the most suitable. The use of elevated temperatures also considerably improves the physical properties of the deposit.

Another expedient which may be employed to decrease still further the time required to form the desired thickness of silver chloride is to add to the electrolyte a low concentration of anions which will form with silver a compound more soluble than silver chloride. Fluoride ions, or preferably nitrate ions, may be employed for this purpose.

The anodizing potential and current density art not critical and the most desirable values can readily be determined by those skilled in the art. A potential of about 18 volts has been found satisfactory for all purposes. The anodizing is continued until slightly more than the desired number of ampere minutes to be generated by the cell have passed through the sheet.

The sheet coated with silver chloride is then suspended as a cathode in any suitable electrolyte which will not have a harmful effect on the silver chloride coating. This cathodizing operation may be carried out simply by reversing the polarity of the electrodes in the bath used for the anodizing operation described above. Preferably, however, the sheet is removed from the anodizing bath and suspended as a cathode in an aqueous solution of sodium chloride for the required period of time. A solution containing about 5 per cent of sodium chloride has been found very suitable. Obviously, other electrolytes may be employed.

This cathodizing operation is usually carried out at or above the current density at which the cathode is intended to be discharged in the cell in which it is to be employed, so as to insure the ability of the cathode to carry this current density when the action of the cell is initiated. The cathodizing operation is made brief, usually a matter of seconds, the time being sufficiently short that only a minimum of the capacity of the electrode is destroyed by reduction of silver chloride to metallic silver but sufficiently long that the activation is fully adequate to develop the full voltage within the desired time after admission of electrolyte.

The silver sheet is then immersed in a suitable reducing agent adapted to reduce chemically the entire outer surface of the silver chloride to a conductive layer of porous silver. One of the most effective reducing agents for the formation of this conductive layer on the silver chloride in an aqueous solution of hydroxylamine.

Other suitable reducing agents are aqueous solutions of any of the common phtographic developers, such as p-aminophenol, o-aminophenol, amidol (2,4-diaminophenol hydrochloride), metol (p-methylaminophenol sulfate), catechol, or hydroquinone. The concentrations which are common for photographic developing are suitable and the pH of the solutions should be adjusted as in photographic developing solutions. Immersion for one to three minutes is ordinarily satisfactory. The exact time depends upon the dilution temperature and age of the developing solution.

A particularly effective reducing solution of the photographic developer type contains, in each liter of aqueous solution approximately 1.5 grams of hydroquinone, 0.5 gram of elon (N-methyl p-aminophenol), 6 grams of anhydrous sodium sulfite and 9 grams of anhydrous sodium carbonate.

In order to consolidate and impart mechanical strength to the silver-surfaced silver chloride coating, the sheet is subjected to a high mechanical pressure, such as ten tons per square inch, to form a compact electrode.

This pressing operation which imparts mechanical strength to the silver chloride coating may be performed at any time after the anodizing operation. Thus, the electrode may be subjected to mechanical pressure immediately after anodizing and before the subsequent reducing operations, or it can be pressed after the cathodic reduction and before the chemical surface reduction, or it can be pressed after all three operations have been completed. Most rapid voltage buildup is obtained however, when the pressing is carried out after the cathodic reduction and before the chemical surface reduction.

In order for the cathode disc to make good electrical contact with the anode disc of the next succeeding cell it is necessary that the side of the cathode disc which makes such contact remain uncoated. This may be accomplished by lacquering this side of the silver sheet before subjecting it to the operations referred to above. After the coating has been formed on the other side of the sheet the lacquer may be removed by any suitable means. The flexible coating lacquer which is common for electro-chemical purposes may be readily stripped off.

Magnesium forms a desirable anode material for use with the silver chloride cathodes described above. Substantially pure magnesium or any of the common predominantly magnesium alloys may be used for this purpose. A very suitable alloy is made up of about 1.2 per cent manganese and the remainder magnesium.

In order that the full cell voltage may be reached as quickly as possible after immersion in the electrolyte, it is necessary that all surface contamination which would retard the interaction of electrolyte and anode be removed prior to the assembly of the cell. This may be done conveniently by a simple abrading of the surface of the magnesium, as with a stiff steel wire brush. If a wet cleaning operation is employed, particularly one involving acid etching, an oxide film is formed which retards rapid generation of the cell voltage. This film can be removed by abrading as above or by subjecting the magnesium to a chromating treatment, such as is commonly employed for protecting magnesium from atmospheric corrosion.

The most suitable chromating treatment has been found to consist of immersion of the magnesium for one-half hour at room temperature in an aqueous solution containing 8 ounces of $MgSO_4.7H_2O$ and 5.3 ounces of $Na_2Cr_2O_7.2H_2O$ per gallon of solution, adjusted to a suitable pH (usually about 3.0 to 4.5 depending upon the magnesium alloy) by means of sulfuric acid. This treatment forms a bronze-colored protective film on the surface of the magnesium which tends to protect it from atmospheric corrosion but does not retard the rapid generation of cell voltage. If this chromating treatment is used, the film must be removed from that portion of the anode disc which makes electrical contact with the cathode disc of the adjacent cell.

Where rapid achievement of the peak voltage is desired after immersion of the structure described above in the electrolyte, organic materials such as organic plastics which might give off small quantities of organic substances tending to coat or inactivate the electrode surfaces should be avoided. Therefore it is desirable that the insulating sleeve 4 be made of a mineral substance such as a ceramic material. The insulating washers 5 are also preferably made of a mineral substance such as mica. It is not important of what metal the bolt 3 and the nut 7 are made. Tin-plated brass will ordinarily be found satisfactory. The lugs 8 should be formed of a metal or plated with a metal which does not form an undesirable electrochemical couple with the electrode with which it is in contact. The cathode lug may conveniently be silver plated or tin plated and the anode lug may be tin plated.

Battery structures of the type described above are useful for setting off underwater explosive charges, for flares and for marking devices at sea. To illustrate the rapidity with which the peak voltage and current generating capacity are achieved after immersion in the electrolyte, a structure as described above, having circular magnesium anode discs and silver-silver chloride cathode discs 1¼ inches in diameter and having a peak voltage of about .9 volt per cell and a peak current of about .9 ampere under the conditions of operation, was found to achieve over 80 per cent of its peak voltage and current within .1 second after immersion in sea water. The peak voltage and current were achieved in about ½ second and it was substantially maintained for about one minute.

Although the invention has been described in terms of its specific embodiments, certain modifications and equivalents will be apparent to those skilled in the art and are intended to be included within the scope of the present invention which is to be limited only by the reasonable scope of the appended claims.

What is claimed is:

1. A structure adapted to function as an electric battery when immersed in sea water comprising a threaded metal bolt, a plurality of circular sheet metal discs mounted by means of central holes upon said bolt and insulated therefrom by a ceramic sleeve surrounding said bolt, said disc comprising alternately magnesium anode discs and cathode discs made up of silver sheet coated on one side with silver chloride, said silver chloride having a thin layer of porous reduced metallic silver on its outer surface and a plurality of filamentary bridges of reduced metallic silver extending through the silver chloride and electrically connecting the silver sheet with the outer layer of metallic silver, said alternate magnesium and silver discs being so positioned as to form a plurality of series-connected electric cells, the magnesium and silver discs of each cell being apart by mica washers which are mounted upon said bolt and which are substantially smaller in area than said discs, the remainder of the space between said discs being free, the silver chloride coated surfaces of said silver discs facing toward the interior of said cells, the magnesium and silver discs of adjacent cells being in direct mechanical and electrical contact over an area in their central portion which is substantially less than the total area of the discs, the magnesium discs possessing a dished shape such that when the electrodes are not pressed together the periphery of the magnesium electrode lies in a plane closer to the adjacent silver electrode than does its central area and that a substantial area surrounding said central area lies farther away from the silver electrode than does said central area, said pile of electrode discs and washers being pressed tightly together by means of a nut mounted on said threaded bolt until the said central areas of the magnesium and silver discs which are in contact are pressed firmly together, whereby the peripheries of said magnesium discs are forced against the adjacent silver discs with a pressure sufficient substantially to prevent entry of electrolyte between said adjacent discs during the life of the battery.

2. An electric battery comprising a structure made up of a plurality of circular discs of electrochemically dissimilar anode and cathode sheet material mounted alternately by means of central holes upon a rod so as to form a plurality of series-connected electric cells, the anode and cathode discs of each cell being spaced from one another by insulating washers substantially smaller in diameter than the electrode discs, the remainder of the space between said electrodes being free, said washers being mounted on said rod, the anode and cathode discs of adjacent cells being in direct electrical contact, at least one of the electrodes of each pair in said direct electrical contact possessing a dished shape such that its periphery is normally in a plane closer to the other electrode of the pair than is its center when the battery is not compressed, said dished shape being such that the dished electrode makes contact along its periphery with the adjacent electrode when the battery is compressed and at substantially no other point except in an area at its central portion which area is substantially less than the total area of the disc, said battery being compressed lengthwise at the centers of the electrode discs so as to bring the centers of said dished electrodes as well as their peripheries into mechanical contact with the adjacent electrodes, whereby the peripheries of said dished electrodes are forced against the adjacent electrodes with a pressure sufficient substantially to prevent the entry of electrolyte between said electrodes during the life of the battery, said structure being immersed in a liquid which acts as a common electrolyte for all said cells.

3. The battery described in claim 2 wherein the anode discs are formed of a metal which is predominantly magnesium and wherein the cathode discs are each coated on the surfaces facing the interior of the cells with a layer of silver chloride having a thin layer of porous reduced metallic silver on its outer surface and a plurality of filamentary bridges of reduced metallic silver extending through the silver chloride layer and electrically connecting the silver sheet with the outer layer of metallic silver.

4. The battery described in claim 2 wherein the anode discs are formed of a metal which is predominantly magnesium and wherein the cathode discs are each coated on the surfaces facing the interior of the cells with a layer of silver chloride having a thin layer of porous reduced metallic silver on its outer surface and a plurality of filamentary bridges of reduced metallic silver extending through the silver chloride layer and electrically connecting the silver sheet with the outer layer of metallic silver, and wherein the liquid acting as an electrolyte is sea water.

5. A structure adapted to function as an electric battery when immersed in an electrolyte comprising a plurality of sheet anodes and cathodes formed of electrochemically dissimilar materials mounted alternately by means of holes upon a rod so as to form a plurality of series connected electric cells the anodes and cathodes of each cell being spaced from one another by insulating means, the anodes and cathodes of adjacent cells being in direct electrical contact, at least one of the electrodes of each pair in said direct electrical contact possessing a dished shape such that its periphery is normally in a plane closer to the other electrode of the pair than is its center when the electrodes are not pressed together, said dished shape being such that the dished electrode makes contact along its periphery with the adjacent electrode when the two are pressed together and at substantially no other point except in the area immediately surrounding the hole through which said rod passes, said structure being compressed lengthwise by a pressure applied in the area immediately surrounding said rod whereby the peripheries of said dished electrodes are forced against the adjacent electrodes with a pressure sufficient substantially to prevent the entry of electrolyte between said electrodes during the life of the battery.

6. In a structure adapted to function as an electric battery when immersed in an electrolyte a metal disc forming an electrode of one cell and a second disc of an electrochemically dissimilar metal forming the opposite electrode of a second cell said discs being mounted by means of central holes upon a rod and being disposed adjacent to one another and in mechanical and electrical contact, at least one of said discs possessing a dished shape such that said mechanical contact is confined to substantially a line along the periphery of said dished disc and an area surrounding the central hole of said disc substantially less than the total area of said disc, substantial pressure being exerted by said periphery against the other disc so as substantially to exclude the electrolyte from between said discs during the life of the battery.

7. In a structure adapted to function as an electric battery when immersed in an electrolyte a sheet electrode of one cell positioned adjacent to a sheet electrode of opposite polarity of another cell said electrodes being formed of electro chemically dissimilar materials and being in mechanical and electrical contact with one another over an area of the central portions of the electrodes substantially less than the total area of the electrodes, one of said electrodes being dished in such manner that when the electrodes are not pressed together the periphery of the dished electrode lies in a plane closer to the other electrode than does the central area of the dished electrode which makes said electrical and mechanical contact and a substantial area surrounding said central area lies farther away from the other electrode than does the said central area, said electrodes being pressed together tightly in said central area whereby the periphery of the dished electrode is forced against the adjacent electrode with a pressure sufficient substantially to prevent entry of electrolyte between said electrodes during the life of the battery.

8. A structure adapted to function as an electric battery when immersed in an electrolyte comprising a plurality of alternately disposed anode and cathode sheets formed of electrochemically dissimilar materials forming a plurality of series connected electric cells, the anode and cathode sheets of each cell being spaced from one another, the anode and cathode sheets of adjacent cells being in mechanical and electrical contact with one another over an area of the central portions of the electrodes substantially less than the total area of the electrodes, one of said electrodes being dished in such manner that when the electrodes are not pressed together the periphery of the dished electrode lies in a plane closer to the other electrode than does the central area of the dished electrode which makes said electrical and mechanical contact and a substantial area surrounding said central area lies farther away from the other electrode than does the said central area said electrodes being pressed together tightly in said central area whereby the periphery of the dished electrode is forced against the adjacent electrode with a pressure sufficient substantially to prevent entry of electrolyte between said electrodes during the life of the battery.

9. The battery described in claim 8 wherein the anode discs are formed of a metal which is predominantly magnesium and wherein the cathode discs are each coated on the surfaces facing the interior of the cells with a layer of silver chloride having a thin layer of porous reduced metallic silver on its outer surface and a plurality of filamentary bridges of reduced metallic silver extending through the silver chloride layer and electrically connecting the silver sheet with the outer layer of metallic silver.

RAYMOND L. TAYLOR.

REFERENCES CITED

The following references are of record in the file of this patent:

UNITED STATES PATENTS

| Number | Name | Date |
| --- | --- | --- |
| 403,451 | Barrett | May 14, 1889 |
| 1,332,483 | Bridge | Mar. 2, 1920 |